US008441869B2

United States Patent
Kim

(10) Patent No.: US 8,441,869 B2
(45) Date of Patent: May 14, 2013

(54) DATA STORAGE SYSTEMS AND METHODS USING DATA ATTRIBUTE-BASED DATA TRANSFER

(75) Inventor: Chul-Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 280 days.

(21) Appl. No.: 12/796,125

(22) Filed: Jun. 8, 2010

(65) Prior Publication Data
US 2010/0322020 A1   Dec. 23, 2010

(30) Foreign Application Priority Data

Jun. 22, 2009   (KR) .................. 10-2009-0055442

(51) Int. Cl.
*G11C 7/10* (2006.01)
(52) U.S. Cl.
USPC .................................... 365/189.17
(58) Field of Classification Search ............. 365/185.03, 365/185.11, 185.13, 230.03, 189.17
See application file for complete search history.

(56) References Cited

U.S. PATENT DOCUMENTS

| | | | |
|---|---|---|---|
| 6,751,155 B2 | 6/2004 | Gorobets | |
| 7,212,440 B2 * | 5/2007 | Gorobets | 365/185.11 |
| 2007/0288688 A1 | 12/2007 | Kang | |
| 2008/0288743 A1 * | 11/2008 | Kim | 711/206 |
| 2010/0290283 A1 * | 11/2010 | Choi et al. | 365/185.03 |

FOREIGN PATENT DOCUMENTS

| | | |
|---|---|---|
| JP | 2005-504388 | 2/2005 |
| JP | 2006-221333 | 8/2006 |
| JP | 2007-334863 | 12/2007 |
| KR | 100765786 | 10/2007 |
| WO | WO 03/029951 A3 | 4/2003 |

* cited by examiner

*Primary Examiner* — VanThu Nguyen
*Assistant Examiner* — Khamdan Alrobaie
(74) *Attorney, Agent, or Firm* — Myers Bigel Sibley & Sajovec, P.A.

(57) ABSTRACT

Some embodiments of the present invention provide data storage systems including a plurality of memories and a control circuit coupled to the plurality of memories by a common channel. The control circuit is configured to sequentially transfer respective units of data to respective memories within each of a plurality of predetermined groups of the plurality of memories over the common channel and to transition from transferring units of data to a first one of the groups to transferring units of data to a second one of the groups based on an attribute of the units of data. The attribute may be related to a programming time associated with a unit of data. For example, the attribute may include a bit significance of the unit of data.

24 Claims, 13 Drawing Sheets

Fig. 10A
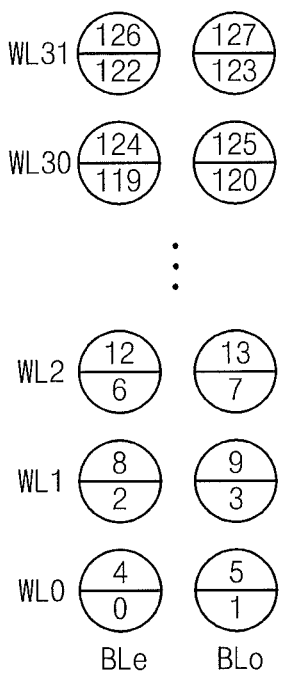

DATA STORAGE SYSTEMS AND METHODS USING DATA ATTRIBUTE-BASED DATA TRANSFER

CROSS-REFERENCE TO RELATED APPLICATIONS

This U.S. non-provisional patent application claims priority under 35 U.S.C §119 of Korean Patent Application No. 10-2009-0055442 filed on Jun. 22, 2009, the entirety of which is hereby incorporated by reference.

BACKGROUND

The present invention relates data storage devices and methods of operation thereof and, more particularly, to data storage systems using multiple storage devices sharing a common data channel and methods of operation thereof.

Computer systems, such as desktop computers and notebook computers, may include a main memory and an external storage device. It is generally preferable that the external storage device provide high storage density at a relatively low price.

Commonly used external storage devices include hard disk drives (HDDs) that use disk storage media. Such disk storage devices may provide a large capacity at a relatively low price, but their operations may include relatively complex mechanical operations, such as mechanical control of a magnetic transducer head. Disk storage devices may also be vulnerable to damage from physical impacts, and may be regarded as having a relatively low reliability.

Traditional semiconductor memories, such as DRAM or SRAM, have not generally been used as alternatives to disk-based external storage. Although semiconductor-type external memory devices may provides faster access than disk drives and be less vulnerable to mechanical damage, there may be several drawbacks of using such devices for external mass storage. For example, price per unit capacity of SRAM devices tends to be high in relation to disk drives. Additional power needed to retain data in DRAM devices may increase the cost of using such devices. Power consumption associated with DRAM refresh operations may make it difficult to use DRAM in mobile applications.

Flash memory based devices, however, may provide viable alternatives to disk drives for external storage. Typical flash memory devices may be programmed more than once. Flash memory devices may also have a relatively simple structure, which may make fabrication less costly. Flash memory devices may be low-power, compact, light and resistant to physical impact, so they may be suitable for use in mobile applications.

SUMMARY

Some embodiments of the present invention provide data storage systems including a plurality of memories and a control circuit coupled to the plurality of memories by a common channel. The control circuit is configured to sequentially transfer respective units of data to respective memories within each of a plurality of predetermined groups of the plurality of memories over the common channel and to transition from transferring units of data to a first one of the groups to transferring units of data to a second one of the groups based on an attribute of the units of data. The attribute may be related to a programming time associated with a unit of data. For example, the attribute may include a bit significance of the unit of data.

In some embodiments, the control circuit may be configured to transition from transferring units of data to a first one of the groups to transferring units of data to a second one of the groups based on the attribute of the units of data according to a program mode of the memory.

In some embodiments, the control circuit may be configured to transfer a first received unit of data to a first memory in a first group of memories and to perform an immediately succeeding transfer of a second received unit of data to a second memory in the first group of memories without waiting for completion of a write operation for the first unit by the first memory.

In some embodiments, the control circuit may be configured to transition from transferring units of data to a first one of the groups to transferring units of data to a second one of the groups based on a bit significance of the units according to a program mode of the memory.

In further embodiments, the control circuit may be configured to condition transfer of a unit of data to the memories based on a ready/busy status of the memories. For example, the control circuit may be configured to delay transfer of a unit of data to a memory pending indication of a ready status of the memory.

Further embodiments of the present invention provide methods of operating a data storage system including a plurality of memories configured to receive data over a common channel. The methods include sequentially transferring respective units of data to respective memories within each of a plurality of predetermined groups of the plurality of memories over the common channel and transitioning from transferring units of data to a first one of the groups to transferring units of data to a second one of the groups based on an attribute of the units of data.

Further embodiments provide apparatus for controlling a data storage system. The apparatus includes an interface circuit configured to transfer data to a plurality of memories over a common channel and a control circuit coupled to interface circuit and configured to control data transfer thereof, the control circuit configured to sequentially transfer respective ones of the received units of data to respective memories within each of a plurality of predetermined groups of the plurality of memories over the common channel and to transition from transferring units of data to a first one of the groups to transferring units of data to a second one of the groups based on an attribute of the units of data.

BRIEF DESCRIPTION OF THE DRAWINGS

FIGS. 10A and 10B are diagrams illustrating program modes applied to flash memories of a data storage system according to some embodiments of the present invention.

DETAILED DESCRIPTION

Some embodiments of the present invention will now be described hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like items throughout.

It will be understood that when an item is referred to as being "connected" or "coupled" to another item, it can be directly connected or coupled to the other item or intervening items may be present. In contrast, when an item is referred to as being "directly connected" or "directly coupled" to another item, there are no intervening items present. As used herein, the term "and/or" includes any and all combinations of one or more of the associated listed items and may be abbreviated as "/".

It will be understood that, although the terms first, second, etc. may be used herein to describe various items, these items should not be limited by these terms. These terms are only used to distinguish one item from another. For example, a "first" item could be termed a "second" item, and, similarly, a "second" item could be termed a "first" item without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated items or operations but do not preclude the presence or addition of one or more other items or operations.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
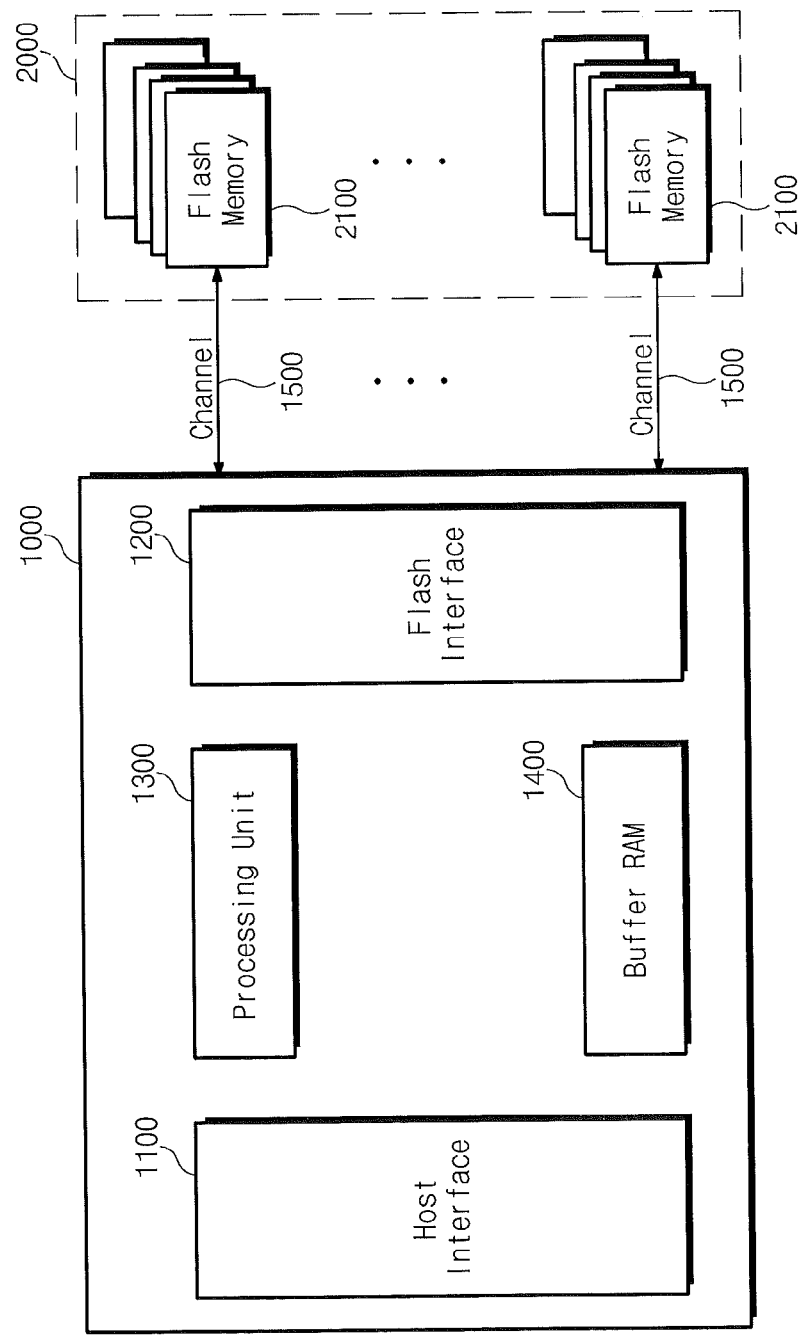
FIG. 1 is a block diagram of a data storage system according to some embodiments of the present invention.

FIG. 1 is a block diagram showing a data storage system according to some embodiments of the present invention. As illustrated in FIG. 1, the data storage system may use storage media 2000 including flash memories, but other embodiments may use storage media other than flash memory. For example, other semiconductor memories, such as charge trap flash (CTF) memory, variable resistance memory (using variable resistance elements), ferroelectric memory and the like, may be used as the storage media in some embodiments. In some embodiments, embodiments of the present invention may be implemented in a memory card, a Solid State Drive/Disk (SSD), a portable storage/reproduction device, or the like.

The data storage system includes a controller circuit 1000 and storage media 2000. The controller circuit 1000 communicates with an external device (for example, a host) via one or more channels. Such channels may conform to an interface standard, such as parallel AT Attachment (PATA), serial ATA (SATA), Universal Serial Bus (USB), Small Computer System Interface circuit (SCSI), Serial Attached SCSI (SAS), PCI-Express, Enhanced Small Disk Interface circuit (ESDI), or Integrated Device Electronics (IDE). The controller circuit 1000 includes a host interface circuit 1100, a flash interface circuit 1200, a processor circuit 1300 and a buffer RAM circuit 1400. It will be appreciated that the controller circuit 1000 may include further components. For example, although not shown in figures, the controller circuit 1000 may include an error correction coding (ECC) circuit that detects and corrects errors of data read out from the storage media 2000.

The host interface circuit 1100 is configured to interface with the external device (for example, a host computer), and the flash interface circuit 1200 is configured to interface with the storage media 2000. The processor circuit 1300 is configured to control an operation of the controller circuit 1000 overall. The buffer RAM circuit 1400 is used to temporarily store data to be written in the storage media 200 or read out from the storage media 2000. The buffer RAM circuit 1400 may be used as a work memory of the processor circuit 1300, further.

Continuing to refer to FIG. 1, the storage media 2000 may be connected to the controller circuit 1000 via one or more channels 1500. Each channel 1500 provides communication between the controller circuit 1000 and a plurality of non-volatile memories 2100, such that the memories 2100 use the associated channel 1500 in common. In some embodiments, all the channels 1500 may be connected to the same type of non-volatile memories, while, in other embodiments, different channels may be connected to different types of non-volatile memories (for example, a flash memory, PRAM, MRAM, etc.). The non-volatile memories 2100 may include, for example, single-level (single bit per cell) flash memory, multi-level (multiple bits per cell) flash memory, a One-NAND flash memory (a single chip including flash memory core and memory control logic), PRAM, MRAM, or the like. For example, a first channel may be connected to a plurality of single-level flash memories, a second channel may be connected to a plurality of multi-level flash memories, and a third channel may be connected to One_NAND flash memories, PRAMs, or MRAMs. Alternatively, each channel may be connected with single-level or multi-level flash memories. Flash memories with a planar array structure or a three-dimensional vertical channel array structure may be used in the storage media 2000.

In some embodiments, flash memories (e.g., flash memory chips) connected with to a channel may be divided into a plurality of groups. For example, memories that store 2 bits per cell may be divided into at least two groups (hereinafter, referred to as the first group and the second group). Similarly, memories that store M bits per cell may be divided into M groups. It will be appreciated that groups may be defined based on other criteria.

The controller circuit 1000 may transfer data over the at least one of the channels 1500 such that data transfer may transition among the group based on at least one attribute of the data being transferred. For example, the attribute may include the bit significance of the data. For example, for transfers to memories that store 2 bits per cell, the attribute may be whether the data being transferred is LSB data or MSB data. If a plurality of memories is divided into a first group and a second group and each of the plurality of memories stores 2 bits per cell, a change of the first and second groups may be made when data sent to memories in a presently selected group changes from lower-bit to upper-bit data. If data sent to memories in a presently selected group remains lower-bit data, the at least one channel may be driven by the controller circuit 1000 so as to transfer data to memories in the presently selected group without a group change. Such a technique can reduce the need to delay data transfer due to a busy status of a memory, and may also reduce peak power.

Figure 2:
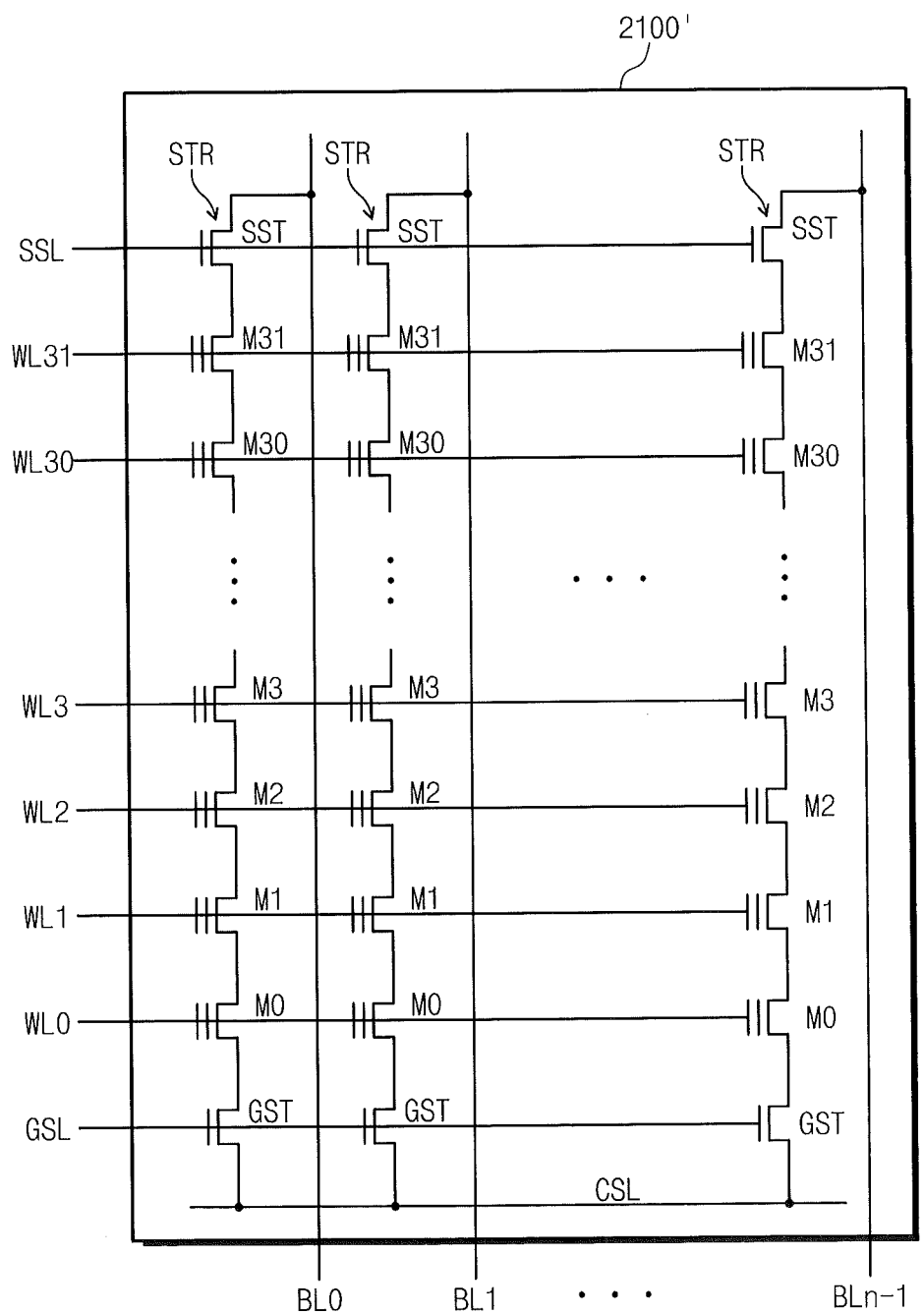
FIG. 2 is a block diagram of an array structure of a flash memory according to some embodiments of the present invention.

FIG. 2 is a block diagram showing an array structure of a flash memory 2100' according to some embodiments of the present invention. Referring to FIG. 2, the flash memory 2100' may include a memory cell array which stores data information and is formed of a plurality of memory blocks. In FIG. 2, there is illustrated one memory block. Remaining memory blocks may be configured substantially the same as illustrated in FIG. 2. The memory block includes a plurality of strings STR coupled to respective bit lines BL0, BL1, ..., BLn−1. Each string STR includes a string select transistor SST connected to a bit line, a ground select transistor GST connected to a common source line CSL and cell transistors M0, M1, M2, M3, ..., M30, M31 serially connected between the string select transistor SST and the ground select transistor GST. The cell transistors M0, M1, M2, M3, ..., M30, M31 have gates connected to respective word lines WL0, WL1, WL2, WL3, ..., WL30, WL31, respectively. The string select transistors SST and the ground select transistors GST are connected to a corresponding string select line SSL and ground select line GSL, respectively. Each cell transistor M0, M1, M2, M3, ..., M30, M31 may store single-bit data or multi-bit data. In FIG. 2, each of memory cells includes a floating gate transistor M0, M1, M2, M3, ..., M30, M31 but, in other embodiments, other types of cells may be used. For example, some embodiments may use charge trap flash (CTF) memory cells, PRAM cells, FRAM cells, RRAM cells and the like.

For purposes of the following operational description, it is assumed that eight flash memories (e.g., chips) are connected to one channel and that each of the flash memories includes memory cells configured to store 2-bit data. With this assumption, the eight flash memories may be divided into two groups, that is, a first group and a second group. The first group includes four flash memories C1, C3, C5, C7 and the second group includes four flash memories C2, C4, C6, C8. This grouping is used for purposes of illustration and the present invention is not limited to such a grouping.

Referring to FIG. 1, when a write operation is requested by a host, data to be stored in a storage media 2000 may be transferred to the buffer RAM circuit 1400 of the controller circuit 1000 from the host. Data stored in the buffer RAM circuit 1400 may be sent to the storage media 2000 via a channel 1500 under the control of the processor circuit 1300 (e.g., according to the control of flash translation logic (FTL) executed by the processor circuit 1300).

According to some embodiments, when a write request arises, group and memory (e.g., chip) selection may be made. For example, the group and memory selection may be made variously according to a mapping policy applied to the data storage system. For example, the group and memory selection may be made by the controller circuit 1000 based on information associated with a previously performed write operation, for example, information of a finally written chip and information of a group including the finally written chip. Such information, for example, may be determined using a mapping table. In some embodiments, when a write operation is requested, group selection may be made. In this case, memories in a selected group may be selected sequentially according to a given order.

If the group and memory selection is made according to the write request, data to be programmed may be transferred to a selected memory in a selected group via a channel. The channel may be driven with data to be programmed via a flash interface circuit 1200. Data loaded on the channel may be sent to the selected memory of the selected group. If data is transferred to the selected memory of the selected group, the selected memory may perform a program operation. Whether data to be programmed in the selected memory of the selected group is upper data or lower data may be determined according to a program mode, as explained in further detail below. Determination of upper data and lower data (or, lower data, intermediate data and upper data) may be made by an address sent to a selected flash memory prior to driving a channel, or an attribute of data transferred to a selected flash memory.

Data to be programmed may be transferred sequentially to flash memories in the selected group. After data to be programmed is transferred sequentially to flash memories in the selected group, it may be determined whether a program operation performed by flash memories in the presently selected group is a higher-order bit program operation or a lower-order bit program operation. This may be made based on a program mode and/or an address sent via the channel. If a program operation to be performed by flash memories in the presently selected group is a higher-order bit program operation, a group change may be made. Flash memories in a newly changed group may be programmed in the same manner as described above.

In some embodiments, a program operation may include a higher-order bit program operation, a lower-order bit program operation, an intermediate-order bit program operation and so on. Time taken to perform a lower-order bit program operation may be different from the time taken to perform an intermediate or higher-order bit program operation. This time may be constrained, for example, on the basis of an allowable program time (for example, a maximum program loop number) regardless of deterioration (or, aging) of memory cells. This means that this program time may be used as a reference needed to change groups.

Although a group change is made, a previously selected group and a presently selected group may perform the same program operation once or more according to a program mode. However, if one group is changed to another group, for the most part, flash memories in a presently selected group may perform a different program operation from flash memories in a previously selected group. This will be described more fully below. Using operations according to some embodiments of the present invention may reduce the number of flash memories programmed at the same time (or, the number of memories having a busy status at the same time). This may cause a reduction of peak current or, an increase in the probability that peak power is reduced.

In some embodiments, operations may be performed using hardware and/or a combination of the hardware and the software (or firmware). For example, the software may include a Flash Translation Layer (FTL) driver. Channel driving by the flash interface circuit 1200 may occur under control of the FTL.

Figure 4:
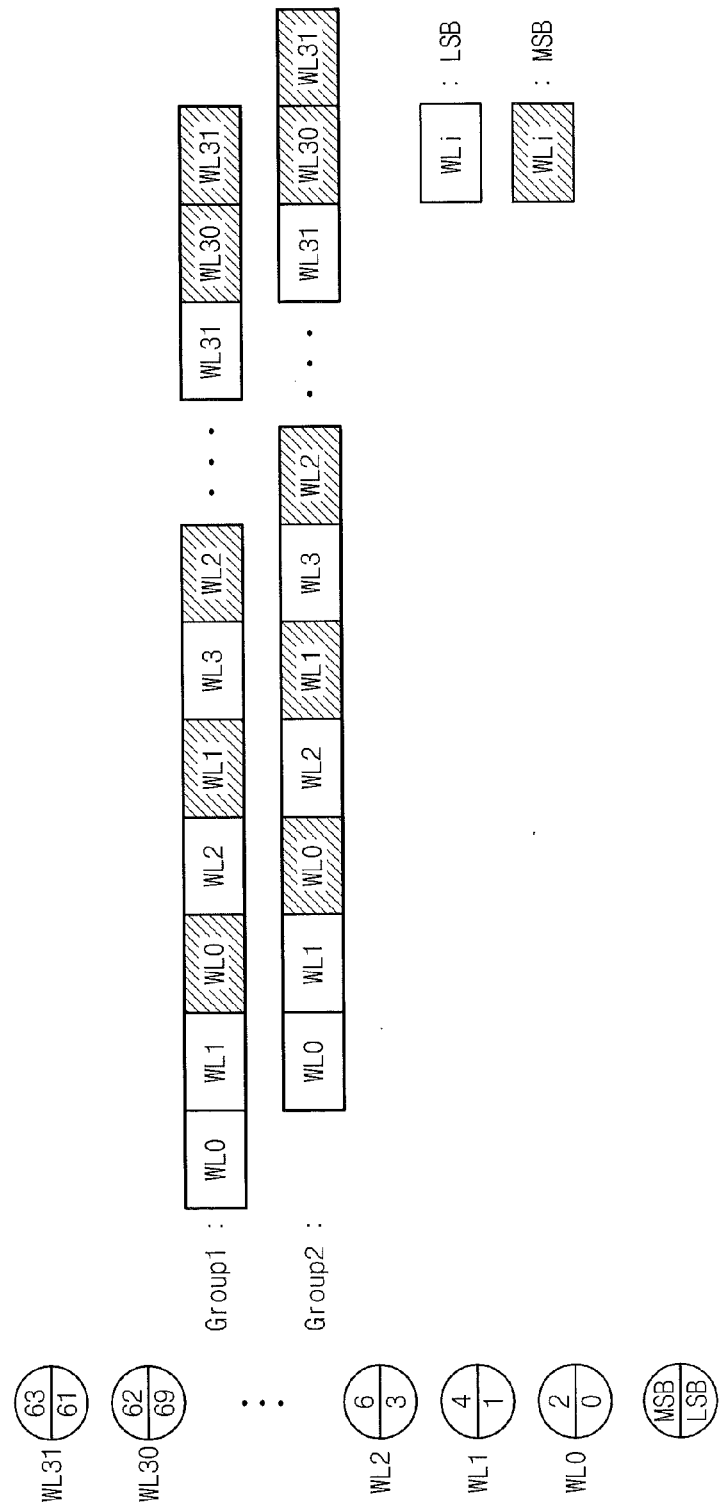
FIG. 4 is a diagram illustrating data storage operations for a program mode according to some embodiments of the present invention.

FIG. 4 is a diagram illustrating programming operations for one program mode according to some embodiments of the present invention. It is assumed that 2-bit data, that is, LSB data and MSB data are stored in each memory cell. As illustrated in FIG. 4, LSB data may be programmed in a memory cell connected with a word line WL0, LSB data in a memory cell connected with a word line WL1 and MSB data in a memory cell connected with the word line WL0. Subsequently, LSB data may be stored in a memory cell connected with the word line WL2, MSB data in a memory cell connected with the word line WL1 and LSB data in a memory cell connected with a word line WL3. Remaining memory cells may be programmed in the same order as described above. This program mode may be referred to as a "shadow" program mode.

Figure 3:
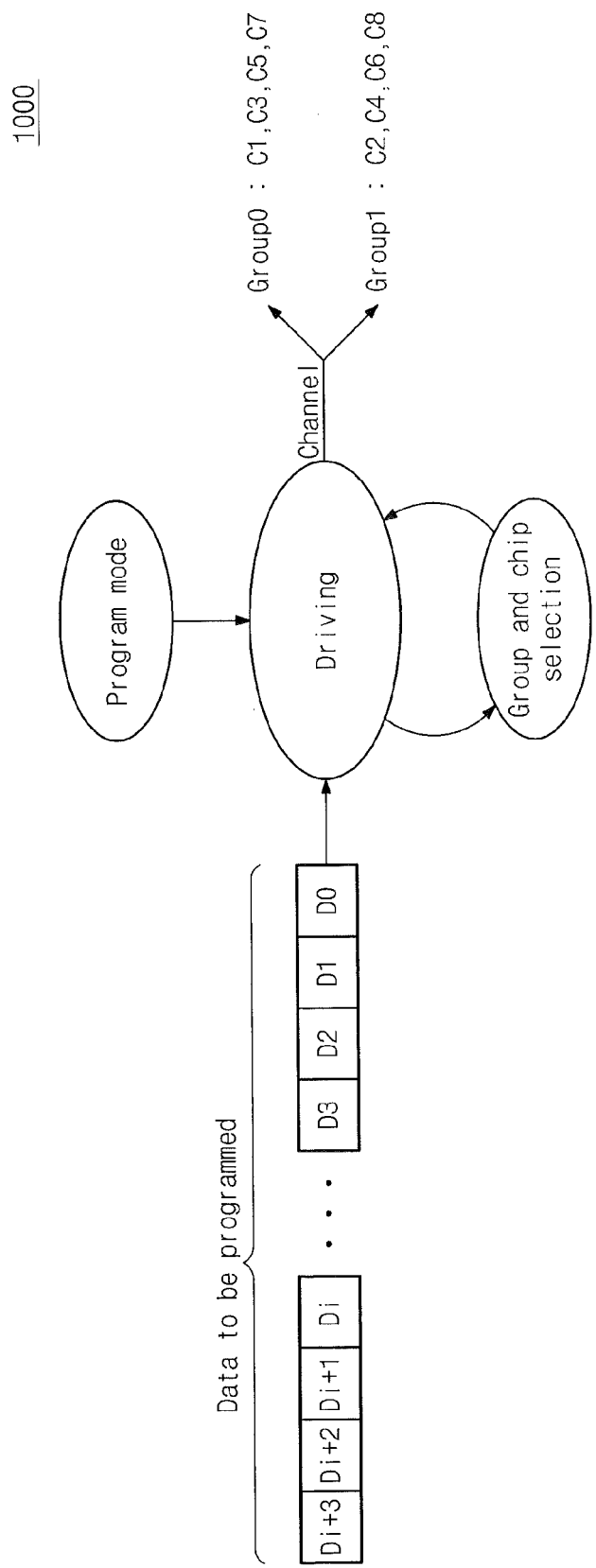
FIG. 3 is a diagram illustrating data storage operations according to some embodiments of the present invention.

Referring to FIG. 4 in conjunction with FIG. 3, in this program mode, word lines of each memory block of flash memories (for example, C1, C3, C5, C7) in the first group Group0 may be selected as illustrated in FIG. 4. In FIG. 4, lack of hatching indicates a word line connected to memory cells in which LSB data is programmed and hatching indicates a word line connected to memory cells in which MSB data is programmed. Likewise, word lines of each memory block of flash memories (for example, C2, C4, C6, C8) in the second group Group1 may be selected as illustrated in FIG. 4.

Figure 5:
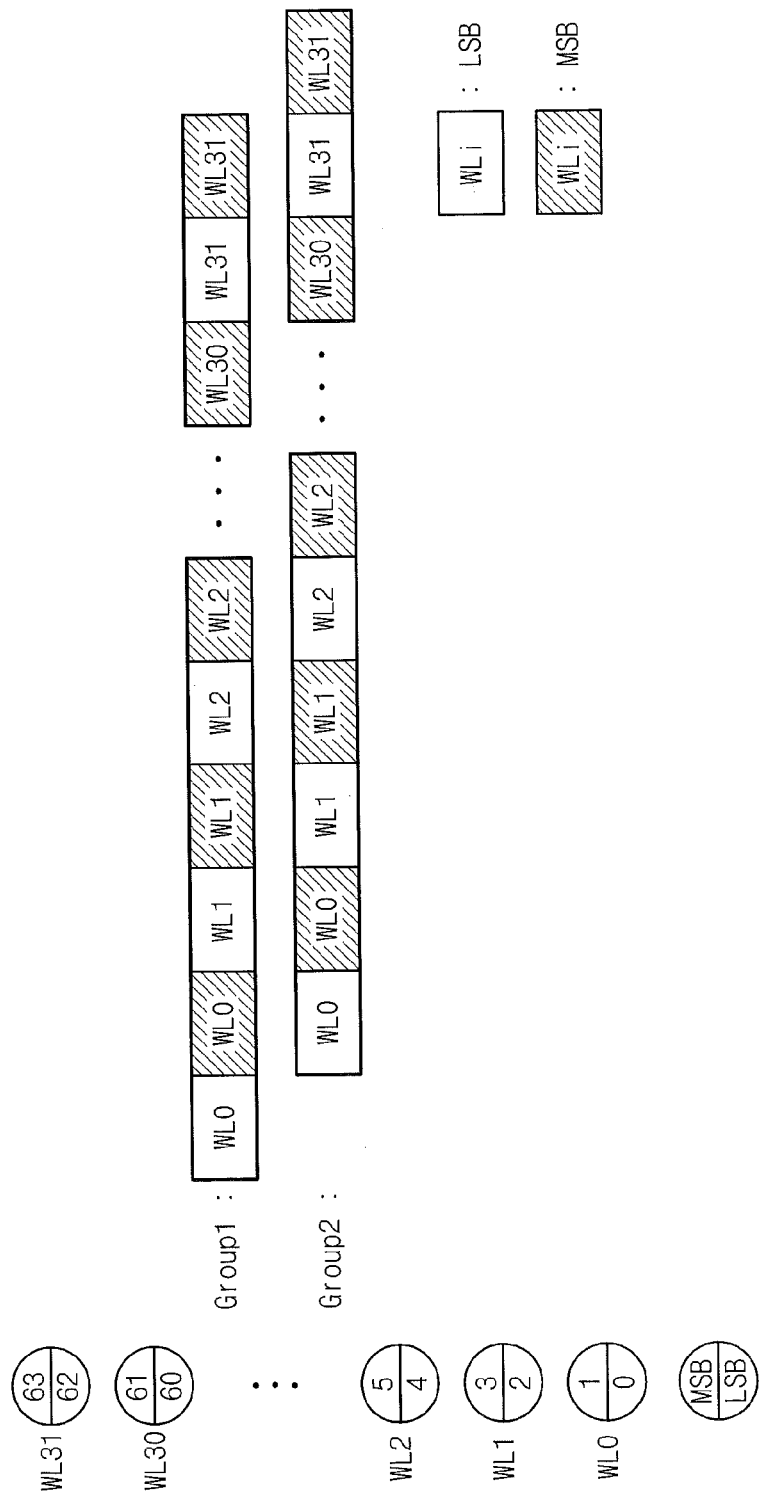
FIG. 5 is a diagram illustrating data storage operations for another program mode according to some embodiments of the present invention.

FIG. 5 is a diagram illustrating operations for another program mode according to further embodiments of the present invention. It is assumed that 2-bit data, that is, LSB data and MSB data are stored in each memory cell. LSB data and MSB data may be sequentially programmed in a memory cell connected with a word line WL0. And then, LSB data and MSB data may be sequentially programmed in a memory cell connected to a word line WL1. Memory cells connected with each of remaining word lines WL2-WL31 may be programmed in the same manner as described above.

For the above-described program mode, word lines of each memory block of flash memories (for example, memories C1, C3, C5, C7) in the first group Group0 may be selected as illustrated in FIG. 5. In FIG. 5, lack of hatching indicates a word line for which LSB data is programmed and hatching indicates a word line for which MSB data is programmed. Likewise, word lines of each memory block of flash memories (for example, memories C2, C4, C6, C8) in the second group Group1 may be selected as illustrated in FIG. 5.

Figure 6:
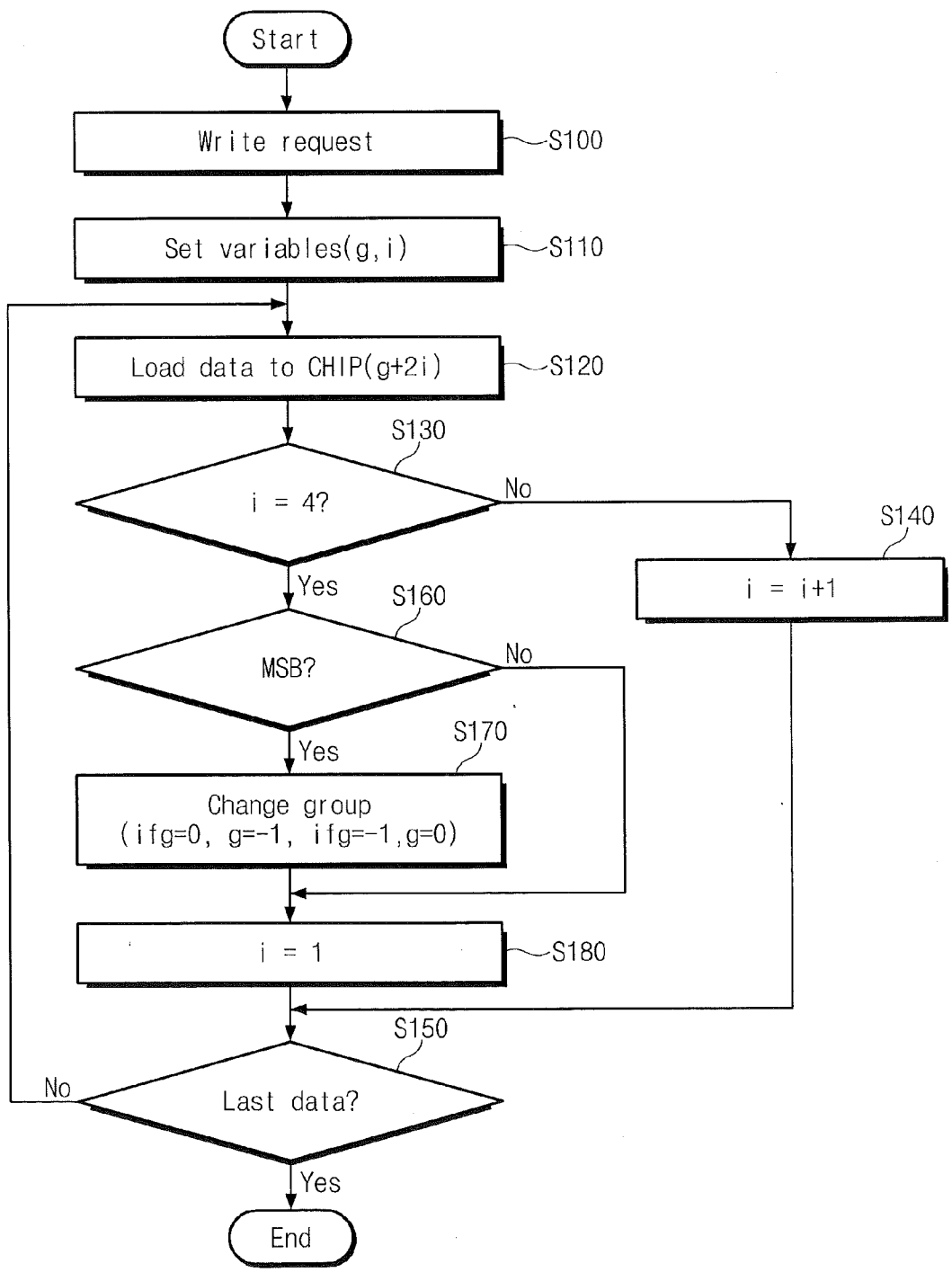
FIG. 6 is a flowchart illustrating data storage operations according to some embodiments of the present invention.
Figure 7:
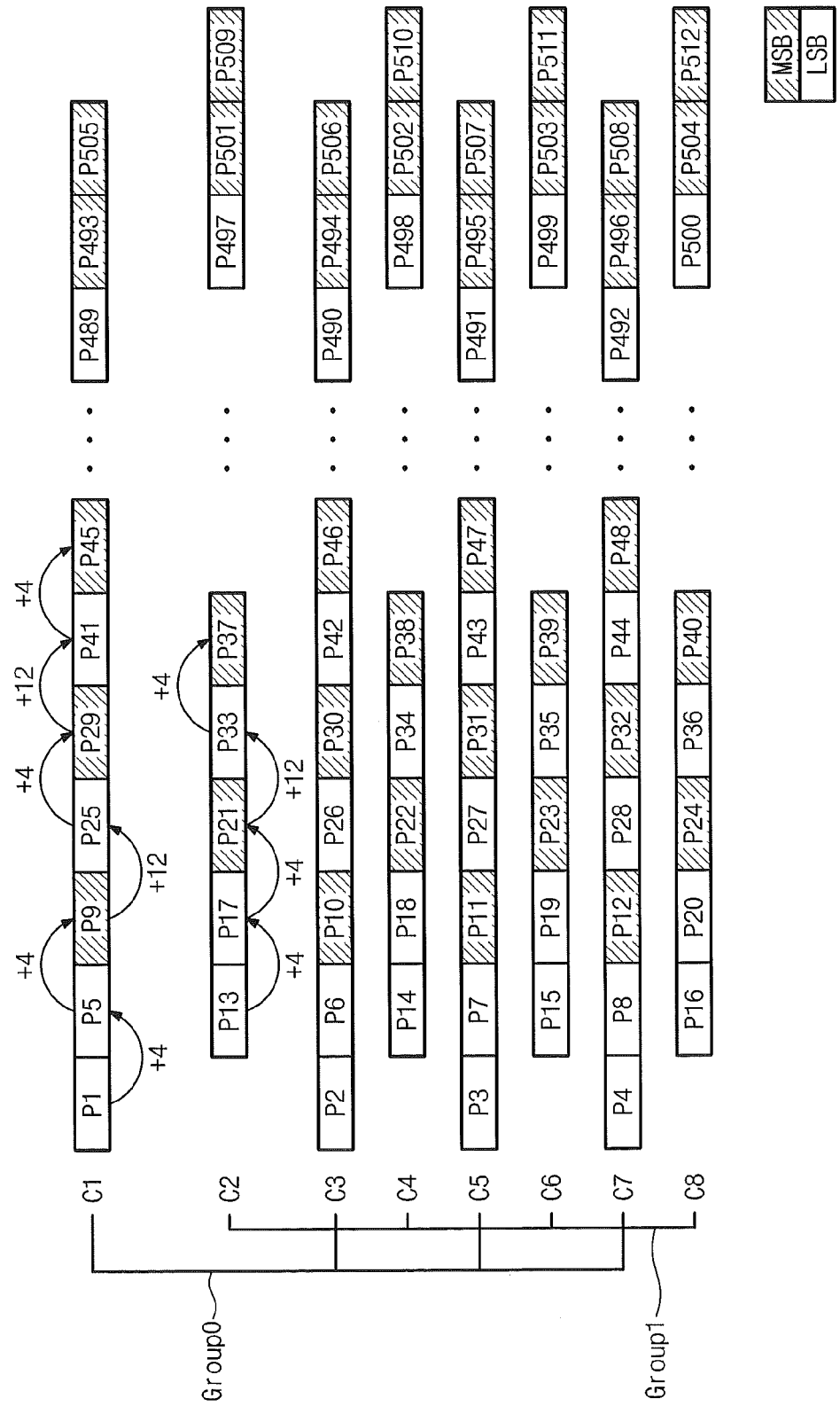
FIG. 7 is a diagram illustrating data flow in a data storage system according to some embodiments of the present invention.
Figure 8:
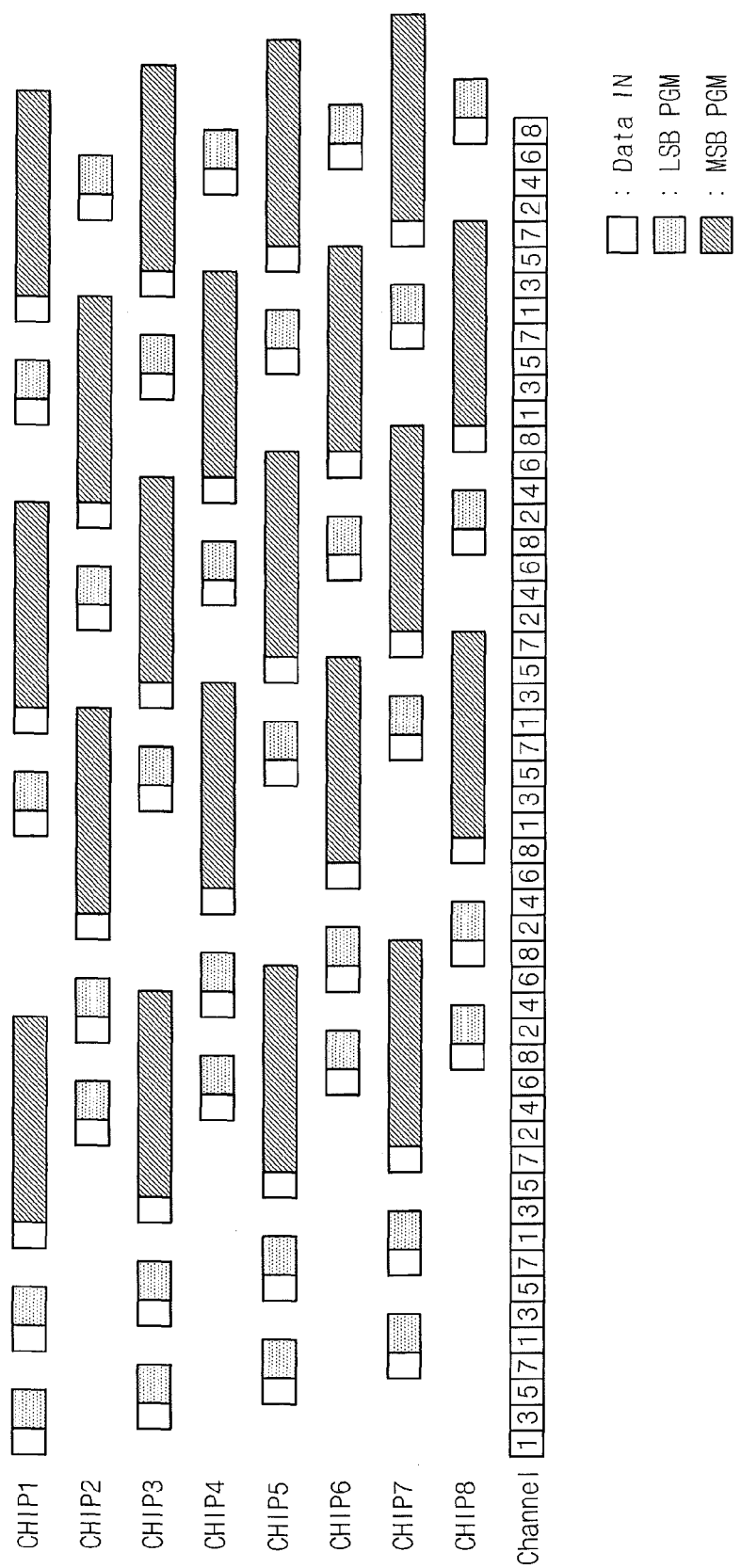
FIG. 8 is a diagram illustrating states of a data transfer channel according to some embodiments of the present invention.

FIG. 6 is a flowchart illustrating operations according to some embodiments of the present invention, and FIG. 7 is a diagram showing data flow for flash memories of each group via a channel according to such operations and FIG. 8 is a diagram showing states of the channel for such operations. It is assumed that 2-bit data, that is, LSB data and MSB data, are stored in each memory cell and that flash memories connected with a channel are divided into the first group Group0 of memories C1, C3, C5, C7 and the second group Group1 of memories C2, C4, C6, C8.

A request for a write operation is received from an external device (for example, a host computer) (Block S100). The request may include data to be stored in a data storage system may be transferred to a buffer RAM circuit 1400. In response to the write request, a value g indicating a group and a value i indicating a flash memory in a group is determined (Block S110). For example, as described above, the values g and i may be set up according to information associated with a just previously performed write operation. For purposes of illustration, it is assumed that the variables g and i are set respectively to −1 and 1 to select the first group Group0 and the first flash memory C1 in the first group Group0 (the first group Group0 is selected when g is −1, and the second group Group1 is selected when g is 1).

A flash interface circuit 1200 (see FIG. 1) may drive a channel with data P1 (see FIG. 7) to be transferred to the first flash memory C1 of the first group Group0. Memory selection may be made according to the values g and i. For example, the memory selection may be made by determining the value of g+2i (Block S120). As set forth above, since the values g and i are −1 and 1, respectively, g+2i is equal to 1. The first flash memory C1 of a selected group, that is, the first group Group0 corresponding to g, may be selected by g+2i. It is then determined whether the value i indicating a flash memory in a selected group is 4 (Block S130). In other words, it may be determined whether a presently selected flash memory is a last flash memory in the selected group. If a presently selected flash memory is not a last flash memory in the selected group, the value i may be increased by 1 (Block S140) and then it may be determined whether data transferred to the channel is last data (Block S150). That is, there may be judged whether data sent from the host all is stored in the storage media 2000. If so, the write operation requested from the host may be terminated. If not, the procedure returns to loading data based on the new value i (Block S120). Since the value i is increased by 1, data P2 (see FIG. 7) may be transferred to the second flash memory C3 of the first group Group0 selected by g+2i.

As illustrated in FIG. 7, page data P1, P2, P3 and P4 may be sent to flash memories C1, C3, C5, C7, respectively, of the first group Group0 using the above-described operations. If the value i reaches 4, transfer of page data P1, P2, P3, P4 to the respective flash memories C1, C3, C5, C7 of the first group Group0 is complete, as illustrated in FIG. 7. The page data P1, P2, P3, P4 sent to the respective flash memories C1, C3, C5, C7 of the first group Group0 may be LSB data. This may be determined by the program mode, as discussed above.

It may then be determined whether data sent to flash memories of a presently selected group is MSB data (Block S160). As described above, this determination may be made based on an applied program mode or an address sent to a selected flash memory. Since the page data P1, P2, P3, P4 sent to the respective flash memories C1, C3, C5, C7 of the first group Group0 may be LSB data, the procedure proceeds to initializing the value i back to 1 (Block S180). Afterwards, it is determined whether data transferred to the channel is last data (Block S150), i.e., it is determined whether all data sent from the host has been stored. If so, the write operation requested from the host is terminated. If not, the procedure returns to loading data based on the new value i (Block S120).

Under the condition that a group is not changed, as illustrated in FIG. 7, page data P5, P6, P7, P8 may be transferred to the respective flash memories C1, C3, C5, C7 of the first group Group0. The page data P5, P6, P7, P8 may be LSB data. This may be made based on an applied program mode or an address sent to a selected flash memory prior to data. Since the page data P5, P6, P7, P8 may be LSB data, no group is changed. Under this condition, page data P9, P10, P11, P12 may be transferred to respective ones of the flash memories C1, C3, C5, C7 of the first group Group0. The page data P9, P10, P11, P12 may be MSB data. This may be determined based on a program mode or an address sent to a selected flash memory.

A group change may be made, in particular, g may be changed to 0 from −1 (block S170). This means that the second group Group1 is selected instead of the first group Group0. In a reverse case, g may be set to −1 from 0, so that the first group Group0 is selected instead of the second group Group1 Upon selection of the second group Group1, as illustrated in FIG. 7, page data P13, P14, P15, P16 may be transferred respectively to flash memories C2, C4, C6, C8 of the second group Group1 via the above-described operations (blocks S120, S130, S160, S170 and S180). The page data P13, P14, P15, P16 transferred respectively to flash memories C2, C4, C6, C8 of the second group Group1 may be LSB data, depending on program mode.

Under the condition that the group is not changed, as illustrated in FIG. 7, page data P16, P17, P18, P19 may be transferred to the respective flash memories C2, C4, C6, C8 of the second group Group1 via the above-described operations (blocks S120, S130, S160, S170 and S180). The page data P16, P17, P18, P19 sent to the respective flash memories C2, C4, C6, C8 of the second group Group1 may be LSB data, depending on program mode. Since the page data P16, P17, P18, P19 sent respectively to the flash memories C2, C4, C6, C8 of the second group Group1 may be LSB data, no group is changed. Under this condition, page data P21, P22, P23, P24 may be transferred to the respective flash memories C2, C4, C6, C8 of the second group Group1 via the above-described operations (blocks S120, S130, S160, S170 and S180). The page data P21, P22, P23, P24 transferred to the respective flash memories C2, C4, C6, C8 of the second group Group1 may be MSB data. This may be judged in the bit order determination operation (block S160). Since the page data P21, P22, P23, P24 transferred to the respective flash memories C2, C4, C6, C8 of the second group Group1 are MSB data, the procedure goes to step S170. That is, a group change may be made (block S170). Afterwards, data write-requested by the host may be stored in flash memories of the storage media 2000 via the channel in the same manner as described above.

With these operations, as illustrated in FIG. 8, all flash memories using a common channel may not have a busy status at the same time. Accordingly, it is possible to reduce peak power. Further, the efficiency of channel usage may be improved, as the time when a channel is maintained at a ready/idle state may be reduced. The timing illustrated in FIG. 8 is obtained under the condition that a data loading time is 200 μs, an LSB program time is 300 μs and MSB program time is 1.6 ms.

The above discussion of some embodiments includes an assumption that eight flash memories (e.g., eight chips) are connected to one channel and that each memory stores 2-bit data per cell. With this assumption, flash memories connected with a channel may be divided into two groups, as discussed above. However, the number of groups of flash memories connected to a common channel may vary according to, for example, the number of data bits stored in each cell. For example, if 3-bit data is stored in each cell, flash memories connected to a common channel may be divided into three groups. Grouping of flash memories connected to a common channel may be made on a basis other than the number of data bits stored in each cell. It is also possible to group flash memories partially connected to a channel.

Figure 9:
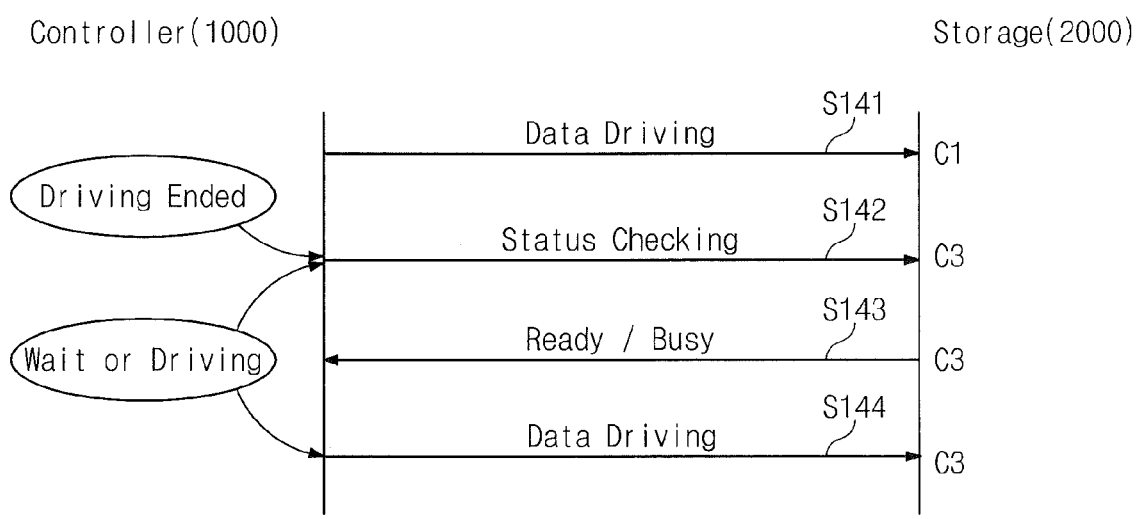
FIG. 9 is a diagram illustrating status checking operations in a data storage system according to some embodiments of the present invention.

FIG. 9 illustrates status-checking operations for a data storage system according to some embodiments of the present invention. As illustrated in FIG. 6, after the end of transfer of data to a first flash memory C1, data may be sent to a second flash memory C3. Before data is sent to the second flash memory C3, status of the second flash memory C3 may be determined as follows (e.g., in the operations shown in block S120 of FIG. 6).

It is assumed that a controller circuit 1000 drives a channel with data to be sent to a first flash memory C1 of a selected group (for example, the first group Group0). Data may be sent to the flash memory C1 of the first group Group0 under control of the controller circuit 1000 (operation S141). The controller circuit 1000 may check a status of second flash memory C3 to be programmed next (operation S142). This may be accomplished, for example, by selecting the second flash memory C3 via a select signal and providing a status command to the second flash memory C3. In response, the second flash memory C3 may output status data indicating a ready status or a busy status (operation S143). The controller circuit 1000 may judge whether the second flash memory C3 has a ready status or a busy status based on the status data received from the second flash memory C3. If the second flash memory C3 is busy, the controller circuit 1000 may wait. The status checking and status reply operations (operations S142 and S143) may be repeated until the second flash memory C3 is ready. If the second flash memory C3 is ready, the controller circuit 1000 may drive the channel with data to be transferred to the second flash memory C3 of the first group Group0 (operation S144). In some embodiments, when the second flash memory C3 is busy, the controller circuit 1000 may be configured to search for a flash memory having a ready status and may send data to that flash memory. A search procedure may be stored in the controller circuit 1000 for a read operation.

As understood from the above description, when a flash memory to be programmed is selected, the controller circuit 1000 may check a status of the selected flash memory prior to transferring data and channel driving for a flash memory to be programmed next may be made according to the result of the status check. It will be appreciated that status checking operations other than described above may be used with the present invention. For example, status of a flash memory to be programmed next may be determined using respective ready/busy signals generated by memories connected to a channel and provided to the controller circuit 1000.

Figure 10B:
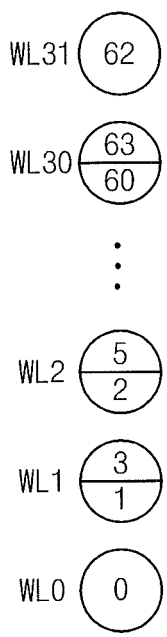

FIGS. 10A and 10B are diagrams showing operations for other program modes applied to flash memories of a data storage system according to further embodiments of the present invention. A program mode illustrated in FIG. 10A is substantially identical to that in FIG. 4 except that pairs of bit lines are selected alternately. For example, when a word line WL0 and an even-numbered bit line BLe are selected, the first page (LSB page data) may be programmed. When the word line WL0 is selected and an odd-numbered bit line BLo is selected, the second page (LSB page data) may be programmed. When a word line WL1 and the even-numbered bit line BLe are selected, the third page (LSB page data) may be programmed. When the word line WL1 is selected and the odd-numbered bit line BLo is selected, the fourth page (LSB page data) may be programmed. If the word line WL0 is selected and the even-numbered bit line BLe is selected, the fifth page (MSB page data) may be programmed. In the event that the word line WL0 is selected and the odd-numbered bit line BLo is selected, the sixth page (MSB page data) may be programmed. If a word line WL2 is selected and the even-numbered bit line BLe is selected, the seventh page (LSB page data) may be programmed. In the event that the word line WL2 is selected and the odd-numbered bit line BLo is selected, the eighth page (LSB page data) may be programmed. As described above, the program mode in FIG. 10A is identical to that in FIG. 4 except that bit lines BLe and BLo are selected in turn. Operations along the lines illustrated in FIG. 6 may be applied to the program mode in FIG. 10A in further embodiments.

A program mode illustrated in FIG. 10B may be different from that in FIG. 4 in that 1-bit data is stored in memory cells connected with word lines WL0 and WL31 just adjacent to string and ground select lines, respectively. In other words, 1-bit data is stored in memory cells connected with word lines WL0 and WL31 just adjacent to string and ground select lines, while 2-bit data (LSB and MSB data) is stored in memory cells connected with word lines WL1 to WL30 in the same manner as described in FIG. 4. Operations along the lines of those discussed above with reference to FIG. 6 may be applied for the program mode in FIG. 10A.

Flash memory devices are kinds of nonvolatile memories capable of keeping data stored therein even without power supply. With a rapid increase of using mobile apparatuses such as cellular phones, personal digital assistants (PDA), digital cameras, portable gaming consoles and MP3 devices, the flash memory devices are widely employed as code storage, as well as data storage. The flash memory devices may be also utilized in home applications such as high-definition TVs, digital versatile disks (DVDs), routers and global positioning systems (GPSs). Data storage systems according to some embodiments of the present invention may be used in such applications.

Figure 11:
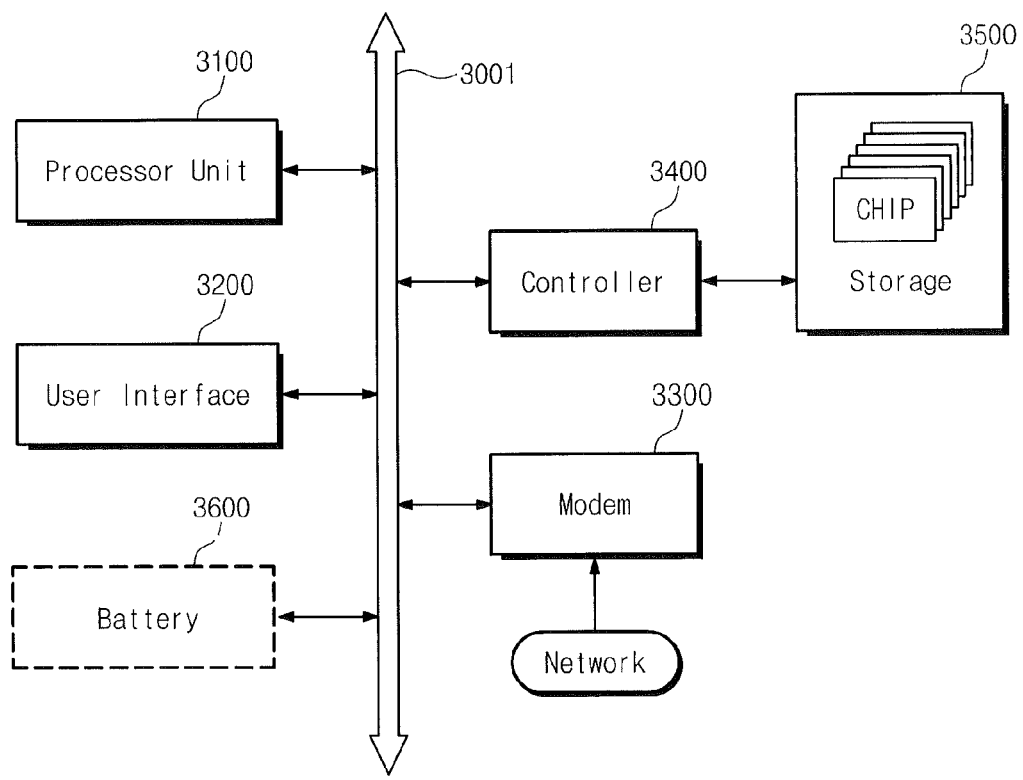
FIG. 11 is a block diagram showing a computing system including a data storage system according to some embodiments of the present invention.

FIG. 11 is a block diagram showing a computing system including a data storage system according to some embodiments of the present invention. The computing system includes a processor circuit 3100 (e.g., a microprocessor), a user interface circuit 3200, a modem circuit 3300 (e.g., a baseband chipset), a memory controller circuit 3400 and storage media 3500. The controller circuit 3400 and the storage media 3500 may be configured along lines discussed above with reference to FIG. 1, and the controller circuit 3400 may transfer data to the storage media 3500 using operations along the lines discussed above with reference to FIGS. 1-10. In the flash memory device 1000, N-bit data (N is a positive integer) to be processed by the processor circuit 3100 are stored via the memory controller circuit 3400. If the computing system shown in FIG. 11 is a mobile apparatus, it may further include a battery 3600. Although not shown in FIG. 11, the computing system may be further equipped with an application chipset, a camera image processor (e.g., CMOS image sensor; CIS), a mobile DRAM and/or other components.

Figure 12:
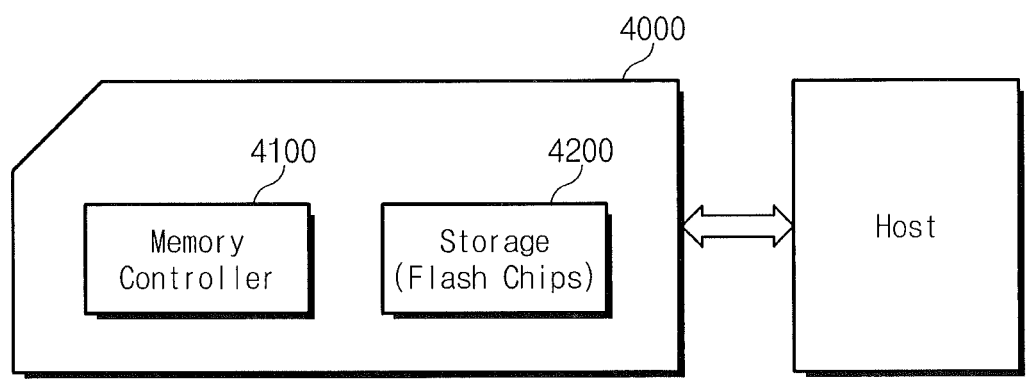
FIG. 12 is a block diagram of a memory card including a data storage system according to some embodiments of the present invention.

FIG. 12 is a block diagram showing a memory card including a data storage system according to exemplary embodiments of the present invention.

Referring to FIG. 12, a memory card 4000 may include a memory controller circuit 4100 and storage media 4200. The storage media 4200 may include a plurality of flash memories and may be connected to the memory controller circuit 4100 via at least one channel. The memory controller circuit 4100 may send data to the storage media 4200 using operations along the lines described above.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

That which is claimed:

1. A data storage system comprising: a plurality of memory chips; and a control circuit coupled to the plurality of memory chips by a common channel, the control circuit configured to sequentially transfer respective units of data to respective memory chips within each of a plurality of predetermined groups of the plurality of memory chips over the common channel and to transition from transferring units of data to a first one of the groups to transferring units of data to a second one of the groups based on an attribute of the units of data.

2. The system of claim 1, wherein the attribute is related to a programming time associated with a unit of data.

3. The system of claim 1, wherein the control circuit is configured to transfer a first received unit of data to a first memory chip in a first group of memory chips and to perform an immediately succeeding transfer of a second received unit of data to a second memory chip in the first group of memory chips without waiting for completion of a write operation for the first unit by the first memory chip.

4. The system of claim 1, wherein the control circuit is configured to transition from transferring units of data to a first one of the groups to transferring units of data to a second one of the groups based on the attribute of the units of data according to a program mode of the memory chip.

5. The system of claim 1, wherein the attribute comprises a bit significance.

6. The system of claim 5, wherein the control circuit is configured to transition from transferring units of data to a first one of the groups to transferring units of data to a second one of the groups based on a bit significance of the units according to a program mode of the memory chip.

7. The system of claim 1, wherein the control circuit is configured to condition transfer of a unit of data to the memory chips based on a ready/busy status of the memory chips.

8. The system of claim 7, wherein the control circuit is configured to delay transfer of a unit of data to a memory chip pending indication of a ready status of the memory chip.

9. A method of operating a data storage system comprising a plurality of memory chips configured to receive data over a common channel, the method comprising: sequentially transferring respective units of data to respective memory chips within each of a plurality of predetermined groups of the plurality of memory chips over the common channel; and transitioning from transferring units of data to a first one of the groups to transferring units of data to a second one of the groups based on an attribute of the units of data.

10. The method of claim 9, wherein sequentially transferring respective units of data to respective memory chips within each of a plurality of predetermined groups of the plurality of memory chips over the common channel comprises: transferring a first unit of data to a first memory chip in a first group of memory chips; and performing an immediately succeeding transfer of a second unit of data to a second memory chip in the first group of memory chips without waiting for completion of a write operation for the first unit by the first memory chip.

11. The method of claim 9, wherein transitioning from transferring units of data to a first one of the groups to transferring units of data to a second one of the groups based on a predetermined criterion comprises transitioning from transferring units of data to a first one of the groups to transferring units of data to a second one of the groups based on the attribute of the units of data according to a program mode of the memory chip.

12. The method of claim 9, wherein the attribute comprises a bit significance.

13. The method of claim 12, wherein transitioning from transferring units of data to a first one of the groups to transferring units of data to a second one of the groups based on a predetermined criterion comprises transitioning from transferring units of data to a first one of the groups to transferring units of data to a second one of the groups based on a bit significance of the units according to a program mode of the memory chip.

14. The method of claim 9, further comprising controlling transfer of a unit of data to the memory chips based on a ready/busy status of the memory chips.

15. The method of claim 14, wherein controlling transfer of a unit of data to the memory chips based on a ready/busy status of the memory chips comprises delaying transfer of a unit of data to a memory chip pending indication of a ready status of the memory chip.

16. An apparatus for controlling a data storage system, the apparatus comprising: an interface circuit configured to transfer data to a plurality of memory chips over a common channel; and a control circuit coupled to interface circuit and configured to control data transfer thereof, the control circuit configured to sequentially transfer respective ones of the received units of data to respective memory chips within each of a plurality of predetermined groups of the plurality of memory chips over the common channel and to transition from transferring units of data to a first one of the groups to transferring units of data to a second one of the groups based on an attribute of the units of data.

17. The apparatus of claim 16, wherein the attribute is related to a programming time associated with a unit of data.

18. The apparatus of claim 16, wherein the control circuit is configured to transfer a first received unit of data to a first memory chip in a first group of memory chips and to perform an immediately succeeding transfer of a second received unit of data to a second memory chip in the first group of memory chips without waiting for completion of a write operation for the first unit by the first memory chip.

19. The apparatus of claim 16, wherein the control circuit is configured to transition from transferring units of data to a first one of the groups to transferring units of data to a second one of the groups based on the attribute of the units of data according to a program mode of the memory chip.

20. The apparatus of claim 16, wherein the attribute comprises a bit significance.

21. The apparatus of claim 20, wherein the control circuit is configured to transition from transferring units of data to a first one of the groups to transferring units of data to a second one of the groups based on a bit significance of the units according to a program mode of the memory chip.

22. The apparatus of claim 16, wherein the control circuit is configured to condition transfer of a unit of data to the memory chips based on a ready/busy status of the memory chips.

23. The apparatus of claim 22, wherein the control circuit is configured to delay transfer of a unit of data to a memory chip pending indication of a ready status of the memory chip.

24. A data storage system comprising:
a plurality of NAND flash memory chips; and
a control circuit coupled to the plurality of NAND flash memory chips by a common channel, the control circuit configured to sequentially transfer respective units of data to respective NAND flash memory chips within each of a plurality of predetermined groups of the plurality of NAND flash memory chips over the common channel and to transition from transferring units of data to a first one of the groups to transferring units of data to a second one of the groups based on whether the units of data are least significant bit (LSB) or most significant bit (MSB) pages.

* * * * *